United States Patent
Wang et al.

(10) Patent No.: US 10,671,873 B2
(45) Date of Patent: Jun. 2, 2020

(54) SYSTEM AND METHOD FOR VEHICLE WHEEL DETECTION

(71) Applicant: TuSimple, Inc., San Diego, CA (US)

(72) Inventors: Panqu Wang, San Diego, CA (US); Pengfei Chen, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

(21) Appl. No.: 15/917,331

(22) Filed: Mar. 9, 2018

(65) Prior Publication Data

US 2018/0260651 A1 Sep. 13, 2018

Related U.S. Application Data

(63) Continuation-in-part of application No. 15/456,294, filed on Mar. 10, 2017, now Pat. No. 10,147,192, and
(Continued)

(51) Int. Cl.
G06K 9/32 (2006.01)
G06K 9/00 (2006.01)
(Continued)

(52) U.S. Cl.
CPC ............ G06K 9/3241 (2013.01); G01S 17/89 (2013.01); G06K 9/00791 (2013.01);
(Continued)

(58) Field of Classification Search
CPC ............ G06K 9/3241; G06K 9/00805; G06K 9/6271; G06K 9/4628; G06K 9/00791;
(Continued)

(56) References Cited

U.S. PATENT DOCUMENTS 6,777,904 B1 8/2004 Degner
7,103,460 B1 9/2006 Breed
(Continued)

FOREIGN PATENT DOCUMENTS

EP 1754179 A1 2/2007
EP 2448251 A2 5/2012
(Continued)

OTHER PUBLICATIONS

CN105118044B Translation, Dec. 2, 2015 (Year: 2015).*
(Continued)

Primary Examiner — Frederick M Brushaber
(74) Attorney, Agent, or Firm — Paul Liu; Jim Salter

(57) ABSTRACT

A system and method for vehicle wheel detection is disclosed. A particular embodiment can be configured to: receive training image data from a training image data collection system; obtain ground truth data corresponding to the training image data; perform a training phase to train one or more classifiers for processing images of the training image data to detect vehicle wheel objects in the images of the training image data; receive operational image data from an image data collection system associated with an autonomous vehicle; and perform an operational phase including applying the trained one or more classifiers to extract vehicle wheel objects from the operational image data and produce vehicle wheel object data.

20 Claims, 10 Drawing Sheets

Related U.S. Application Data a continuation-in-part of application No. 15/456,210, filed on Mar. 10, 2017, now Pat. No. 9,953,236.

(51) Int. Cl.
| | |
|---|---|
| *G06K 9/46* | (2006.01) |
| *G06K 9/62* | (2006.01) |
| *G06T 7/194* | (2017.01) |
| *G01S 17/89* | (2020.01) |

(52) U.S. Cl.
CPC ....... *G06K 9/00805* (2013.01); *G06K 9/4628* (2013.01); *G06K 9/6271* (2013.01); *G06T 7/194* (2017.01); *G06T 2207/20081* (2013.01); *G06T 2207/30252* (2013.01)

(58) Field of Classification Search
CPC ........... G06T 7/194; G06T 2207/20081; G06T 2207/30252; G01S 17/89
See application file for complete search history.

(56) References Cited

U.S. PATENT DOCUMENTS

| | | | |
|---|---|---|---|
| 7,689,559 B2 | 3/2010 | Canright | |
| 7,783,403 B2 | 8/2010 | Breed | |
| 7,844,595 B2 | 11/2010 | Canright | |
| 8,041,111 B1 | 10/2011 | Wilensky | |
| 8,064,643 B2 | 11/2011 | Stein | |
| 8,082,101 B2 | 12/2011 | Stein | |
| 8,164,628 B2 | 4/2012 | Stein | |
| 8,175,376 B2 | 5/2012 | Marchesotti | |
| 8,271,871 B2 | 9/2012 | Marchesotti | |
| 8,378,851 B2 | 2/2013 | Stein | |
| 8,392,117 B2 | 3/2013 | Dolgov | |
| 8,401,292 B2 | 3/2013 | Park | |
| 8,412,449 B2 | 4/2013 | Trepagnier | |
| 8,478,072 B2 | 7/2013 | Aisaka | |
| 8,553,088 B2 | 10/2013 | Stein | |
| 8,788,134 B1 | 7/2014 | Litkouhi | |
| 8,908,041 B2 | 12/2014 | Stein | |
| 8,917,169 B2 | 12/2014 | Schofield | |
| 8,963,913 B2 | 2/2015 | Baek | |
| 8,965,621 B1 | 2/2015 | Urmson | |
| 8,981,966 B2 | 3/2015 | Stein | |
| 8,993,951 B2 | 3/2015 | Schofield | |
| 9,002,632 B1 | 4/2015 | Emigh | |
| 9,008,369 B2 | 4/2015 | Schofield | |
| 9,025,880 B2 | 5/2015 | Perazzi | |
| 9,042,648 B2 | 5/2015 | Wang | |
| 9,111,444 B2 | 8/2015 | Kaganovich | |
| 9,117,133 B2 | 8/2015 | Barnes | |
| 9,118,816 B2 | 8/2015 | Stein | |
| 9,120,485 B1 | 9/2015 | Dolgov | |
| 9,122,954 B2 | 9/2015 | Srebnik | |
| 9,134,402 B2 | 9/2015 | Sebastian | |
| 9,145,116 B2 | 9/2015 | Clarke | |
| 9,147,255 B1 | 9/2015 | Zhang | |
| 9,156,473 B2 | 10/2015 | Clarke | |
| 9,176,006 B2 | 11/2015 | Stein | |
| 9,179,072 B2 | 11/2015 | Stein | |
| 9,183,447 B1 | 11/2015 | Gdalyahu | |
| 9,185,360 B2 | 11/2015 | Stein | |
| 9,191,634 B2 | 11/2015 | Schofield | |
| 9,233,659 B2 | 1/2016 | Rosenbaum | |
| 9,233,688 B2 | 1/2016 | Clarke | |
| 9,248,832 B2 | 2/2016 | Huberman | |
| 9,248,835 B2 | 2/2016 | Tanzmeister | |
| 9,251,708 B2 | 2/2016 | Rosenbaum | |
| 9,277,132 B2 | 3/2016 | Berberian | |
| 9,280,711 B2 | 3/2016 | Stein | |
| 9,286,522 B2 | 3/2016 | Stein | |
| 9,297,641 B2 | 3/2016 | Stein | |
| 9,299,004 B2 | 3/2016 | Lin | |
| 9,315,192 B1 | 4/2016 | Zhu | |
| 9,317,033 B2 | 4/2016 | Ibanez-Guzman | |
| 9,317,776 B1 | 4/2016 | Honda | |
| 9,330,334 B2 | 5/2016 | Lin | |
| 9,342,074 B2 | 5/2016 | Dolgov | |
| 9,355,635 B2 | 5/2016 | Gao | |
| 9,365,214 B2 | 6/2016 | Ben Shalom | |
| 9,399,397 B2 | 7/2016 | Mizutani | |
| 9,428,192 B2 | 8/2016 | Schofield | |
| 9,436,880 B2 | 9/2016 | Bos | |
| 9,438,878 B2 | 9/2016 | Niebla | |
| 9,443,163 B2 | 9/2016 | Springer | |
| 9,446,765 B2 | 9/2016 | Ben Shalom | |
| 9,459,515 B2 | 10/2016 | Stein | |
| 9,466,006 B2 | 10/2016 | Duan | |
| 9,476,970 B1 | 10/2016 | Fairfield | |
| 9,490,064 B2 | 11/2016 | Hirosawa | |
| 9,519,831 B2 * | 12/2016 | Liu ................ | G06K 9/00362 |
| 9,531,966 B2 | 12/2016 | Stein | |
| 9,535,423 B1 | 1/2017 | Debreczeni | |
| 9,555,803 B2 * | 1/2017 | Pawlicki ............... | B60W 10/20 |
| 9,568,915 B1 | 2/2017 | Berntorp | |
| 9,587,952 B1 | 3/2017 | Slusar | |
| 9,720,418 B2 | 8/2017 | Stenneth | |
| 9,723,097 B2 | 8/2017 | Harris | |
| 9,723,099 B2 | 8/2017 | Chen | |
| 9,738,280 B2 | 8/2017 | Rayes | |
| 9,746,550 B2 | 8/2017 | Nath | |
| 9,953,236 B1 | 4/2018 | Huang | |
| 10,019,805 B1 * | 7/2018 | Robinson ................ | G06T 7/20 |
| 10,147,193 B2 | 12/2018 | Huang | |
| 2005/0278098 A1 * | 12/2005 | Breed ................ | B60R 21/0134 |
| | | | 701/45 |
| 2007/0230792 A1 | 10/2007 | Shashua | |
| 2008/0046150 A1 * | 2/2008 | Breed ................ | B60R 21/0134 |
| | | | 701/45 |
| 2008/0249667 A1 | 10/2008 | Horvitz | |
| 2009/0040054 A1 | 2/2009 | Wang | |
| 2010/0049397 A1 | 2/2010 | Lin | |
| 2010/0226564 A1 | 9/2010 | Marchesotti | |
| 2010/0281361 A1 | 11/2010 | Marchesotti | |
| 2011/0206282 A1 | 8/2011 | Aisaka | |
| 2012/0105639 A1 | 5/2012 | Stein | |
| 2012/0140076 A1 | 6/2012 | Rosenbaum | |
| 2012/0274629 A1 | 11/2012 | Baek | |
| 2014/0145516 A1 | 5/2014 | Hirosawa | |
| 2014/0198184 A1 | 7/2014 | Stein | |
| 2015/0062304 A1 | 3/2015 | Stein | |
| 2015/0071490 A1 * | 3/2015 | Fukata ............... | G06K 9/00791 |
| | | | 382/103 |
| 2015/0325127 A1 * | 11/2015 | Pandita .................... | G08G 1/16 |
| | | | 701/431 |
| 2015/0353082 A1 | 12/2015 | Lee | |
| 2016/0037064 A1 | 2/2016 | Stein | |
| 2016/0094774 A1 | 3/2016 | Li | |
| 2016/0129907 A1 | 5/2016 | Kim | |
| 2016/0146618 A1 * | 5/2016 | Caveney ............... | B60W 30/00 |
| | | | 701/25 |
| 2016/0165157 A1 | 6/2016 | Stein | |
| 2016/0210528 A1 | 7/2016 | Duan | |
| 2016/0321381 A1 | 11/2016 | English | |
| 2016/0375907 A1 | 12/2016 | Erban | |
| 2017/0053538 A1 * | 2/2017 | Samarasekera .... | G06K 9/00637 |
| 2017/0106876 A1 * | 4/2017 | Gordon ............... | B60W 50/082 |
| 2017/0132334 A1 * | 5/2017 | Levinson ............ | G06F 17/5009 |
| 2017/0206418 A1 * | 7/2017 | Schnittman ................ | B25J 5/00 |
| 2018/0053606 A1 * | 2/2018 | Burdoucci ........... | A01D 34/008 |
| 2018/0236828 A1 * | 8/2018 | Dudar ....................... | G01J 5/04 |
| 2018/0260956 A1 | 9/2018 | Huang | |
| 2018/0339708 A1 * | 11/2018 | Geller ............. | B60W 30/18163 |
| 2019/0161085 A1 * | 5/2019 | Dudar ...................... | G06T 7/50 |

FOREIGN PATENT DOCUMENTS

| | | |
|---|---|---|
| EP | 2463843 A2 | 6/2012 |
| EP | 2463843 A3 | 7/2013 |
| EP | 2761249 A1 | 8/2014 |
| EP | 2463843 B1 | 7/2015 |
| EP | 2448251 A3 | 10/2015 |

(56) References Cited

FOREIGN PATENT DOCUMENTS

| EP | 2946336 A2 | 11/2015 |
| --- | --- | --- |
| EP | 2993654 A1 | 3/2016 |
| EP | 3081419 A1 | 10/2016 |
| WO | WO/2005/098739 A1 | 10/2005 |
| WO | WO/2005/098751 A1 | 10/2005 |
| WO | WO/2005/098782 | 10/2005 |
| WO | WO/2010/109419 A1 | 9/2010 |
| WO | WO/2013/045612 | 4/2013 |
| WO | WO/2014/111814 A2 | 7/2014 |
| WO | WO/2014/111814 A3 | 7/2014 |
| WO | WO/2014/201324 | 12/2014 |
| WO | WO/2015/083009 | 6/2015 |
| WO | WO/2015/103159 A1 | 7/2015 |
| WO | WO/2015/125022 | 8/2015 |
| WO | WO/2015/186002 A2 | 12/2015 |
| WO | WO/2015/186002 A3 | 12/2015 |
| WO | WO/2016/135736 | 9/2016 |
| WO | WO/2017/013875 A1 | 1/2017 |

OTHER PUBLICATIONS

Hou, Xiaodi and Zhang, Liqing, "Saliency Detection: A Spectral Residual Approach", Computer Vision and Pattern Recognition, CVPR'07—IEEE Conference, pp. 1-8, 2007.

Hou, Xiaodi and Harel, Jonathan and Koch, Christof, "Image Signature: Highlighting Sparse Salient Regions", IEEE Transactions on Pattern Analysis and Machine Intelligence, vol. 34, num. 1, pp. 194-201, 2012.

Hou, Xiaodi and Zhang, Liqing, "Dynamic Visual Attention: Searching for Coding Length Increments", Advances in Neural Information Processing Systems, vol. 21, pp. 681-688, 2008.

Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.

Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.

Hou, Xiaodi and Zhang, Liqing, "Color Conceptualization", Proceedings of the 15th ACM International Conference on Multimedia, pp. 265-268, ACM, 2007.

Hou, Xiaodi and Zhang, Liqing, "Thumbnail Generation Based on Global Saliency", Advances in Cognitive Neurodynamics, ICCN 2007, pp. 999-1003, Springer Netherlands, 2008.

Hou, Xiaodi and Yuille, Alan and Koch, Christof, "A Meta-Theory of Boundary Detection Benchmarks", arXiv preprint arXiv:1302.5985, 2013.

Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.

Li, Yanghao and Wang, Naiyan and Liu, Jiaying and Hou, Xiaodi, "Demystifying Neural Style Transfer", arXiv preprint arXiv:1701.01036, 2017.

Hou, Xiaodi and Zhang, Liqing, "A Time-Dependent Model of Information Capacity of Visual Attention", International Conference on Neural Information Processing, pp. 127-136, Springer Berlin Heidelberg, 2006.

Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.

Li, Yanghao and Wang, Naiyan and Liu, Jiaying and Hou, Xiaodi, "Factorized Bilinear Models for Image Recognition", arXiv preprint arXiv:1611.05709, 2016.

Hou, Xiaodi, "Computational Modeling and Psychophysics in Low and Mid-Level Vision", California Institute of Technology, 2014.

Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.

Matthew Barth, Carrie Malcolm, Theodore Younglove, and Nicole Hill, "Recent Validation Efforts for a comprehensive Modal Emissions Model", Transportation Research Record 1750, Paper No. 01-0326, College of Engineering, Center for Environmental Research and Technology, University of California, Riverside, CA 92521, date unknown.

Kyoungho Ahn, Hesham Rakha, "The Effects of Route Choice Decisions on Vehicle Energy Consumption and Emissions", Virginia Tech Transportation Institute, Blacksburg, VA 24061, date unknown.

Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.

Schroff, Florian, Dmitry Kalenichenko, James Philbin, (Google), "FaceNet: A Unified Embedding for Face Recognition and Clustering", CVPR 2015.

Dai, Jifeng, Kaiming He, Jian Sun, (Microsoft Research), "Instance-aware Semantic Segmentation via Multi-task Network Cascades", CVPR 2016.

Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.

Tian Li, "Proposal Free Instance Segmentation Based on Instance-aware Metric", Department of Computer Science, Cranberry-Lemon University, Pittsburgh, PA., date unknown.

Mohammad Norouzi, David J. Fleet, Ruslan Salakhutdinov, "Hamming Distance Metric Learning", Departments of Computer Science and Statistics, University of Toronto, date unknown.

Jain, Suyong Dull, Grauman, Kristen, "Active Image Segmentation Propagation", In Proceedings of the IEEE Conference on Computer Vision and Pattern Recognition (CVPR), Las Vegas, Jun. 2016.

MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.

Kendall, Alex, Gal, Yarin, "What Uncertainties Do We Need in Bayesian Deep Learning for Computer Vision", arXiv:1703.04977v1 [cs.CV] Mar. 15, 2017.

Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.

Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.

Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.

P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.

C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.

Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.

Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.

(56) References Cited

OTHER PUBLICATIONS

Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.

Adhiraj Somani, Nan Ye, David Hsu, and Wee Sun Lee, "DESPOT: Online POMDP Planning with Regularization", Department of Computer Science, National University of Singapore, date unknown.

Adam Paszke, Abhishek Chaurasia, Sangpil Kim, and Eugenio Culurciello. Enet: A deep neural network architecture for real-time semantic segmentation. CoRR, abs/1606.02147, 2016.

Jain, Suyong Dutt Grauman, Kristen, "Active Image Segmentation Propagation", In Proceedings of the IEEE Conference on Computer Vision and Pattern Recognition (CVPR), Las Vegas, Jun. 2016.

\* cited by examiner

SYSTEM AND METHOD FOR VEHICLE WHEEL DETECTION

PRIORITY PATENT APPLICATIONS

This patent application draws priority from U.S. non-provisional patent application Ser. No. 15/456,219; filed Mar. 10, 2017. This patent application also draws priority from U.S. non-provisional patent application Ser. No. 15/456,294; filed Mar. 10, 2017. This present non-provisional patent application draws priority from the referenced patent applications. The entire disclosure of the referenced patent applications is considered part of the disclosure of the present application and is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2016-2018, TuSimple, All Rights Reserved.

TECHNICAL FIELD

This patent document pertains generally to tools (systems, apparatuses, methodologies, computer program products, etc.) for image processing, vehicle control systems, and autonomous driving systems, and more particularly, but not by way of limitation, to a system and method for vehicle wheel detection.

BACKGROUND

In autonomous driving systems, the successful perception and prediction of the surrounding driving environment and traffic participants are crucial for making correct and safe decisions for control of the autonomous or host vehicle. In the current literature and application of visual perception, techniques such as object recognition, two-dimensional (2D) object detection, and 2D scene understanding (or semantic segmentation) have been widely studied and used. With the assistance of fast-developing deep learning techniques and computational power (such as graphics processing units [GPUs]), these visual perception techniques have been successfully applied for use with autonomous or host vehicles. Compared with these 2D perception methods, full three dimensional (3D) perception techniques, however, are less studied because of the difficulty in getting robust ground truth data and the difficulty in properly training the 3D models. For example, correct annotation of the 3D bounding box for 3D object detection requires accurate measurement of the extrinsic and intrinsic camera parameters as well as the motion of the autonomous or host vehicle, which are usually difficult or impossible to obtain. Even if ground truth data can be obtained, the 3D model is difficult to train because of the limited amount of training data and inaccurate measurements. As a result, less-expensive and much less functionally-capable alternative solutions have been used in these visual perception applications.

SUMMARY

Vehicle wheels are an important feature for determining the exact location and pose of moving vehicles. Vehicle pose can include the vehicle heading, orientation, speed, acceleration, and the like. However, the use of vehicle wheel features for vehicle control is often neglected in current computer vision and autonomous driving literature and applications. In the various example embodiments disclosed herein, a system and method for vehicle wheel detection using image segmentation is provided. In an example embodiment, the system comprises three components: 1) data collection and annotation, 2) model training using deep convolutional neural networks, and 3) real-time model inference. To leverage the state-of-the-art deep learning models and training strategies, the various example embodiments disclosed herein form the wheel detection problem as a two-class segmentation task, and train on a deep neural network that excels on multi-class semantic segmentation problems. Test results demonstrate that the systems disclosed herein can successfully detect vehicle wheel features under complex driving scenarios in real-time. The various example embodiments disclosed herein can be used in applications, such as 3D vehicle pose estimation and vehicle-lane distance estimation, among others.

Vehicle wheels can be used for vehicle feature analysis for at least three reasons as follows: 1) the perception and prediction of other traffic participants are mostly about their trajectory on the road surface, where wheels can provide the best measurement as they are the vehicle component most adjacent to the road surface; 2) wheels can provide a robust estimate of the vehicle pose, as vehicles generally have four or more wheels to serve as reference points; and 3) wheels are conceptually easy to detect because of their uniform shape and location within the vehicle. When we obtain accurate wheel feature segmentation analysis for a given vehicle, we can obtain or infer valuable vehicle information, such as pose, location, intention, and trajectory. This vehicle information can provide significant benefits for the perception, localization, and planning systems for autonomous driving.

BRIEF DESCRIPTION OF THE DRAWINGS

The various embodiments are illustrated by way of example, and not by way of limitation, in the figures of the accompanying drawings in which:

FIG. 4 (upper image half) also illustrates the blended visualization of the original example image combined with the ground truth;

FIG. 6 (upper image half) also illustrates the blended visualization of the original example image combined with the prediction result;

FIG. 7 (upper image half) also illustrates the blended visualization of the original example image combined with the ground truth;

FIG. 8 (upper image half) also illustrates the blended visualization of the original example image combined with the prediction result;

FIG. 9 (upper image half) also illustrates the blended visualization of the original example image combined with the ground truth;

FIG. 10 (upper image half) also illustrates the blended visualization of the original example image combined with the prediction result;

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

As described in various example embodiments, a system and method for vehicle wheel detection are described herein. An example embodiment disclosed herein can be used in the context of an in-vehicle control system 150 in a vehicle ecosystem 101. In one example embodiment, an in-vehicle control system 150 with an image processing module 200 resident in a vehicle 105 can be configured like the architecture and ecosystem 101 illustrated in FIG. 1. However, it will be apparent to those of ordinary skill in the art that the image processing module 200 described and claimed herein can be implemented, configured, and used in a variety of other applications and systems as well.

Figure 1:
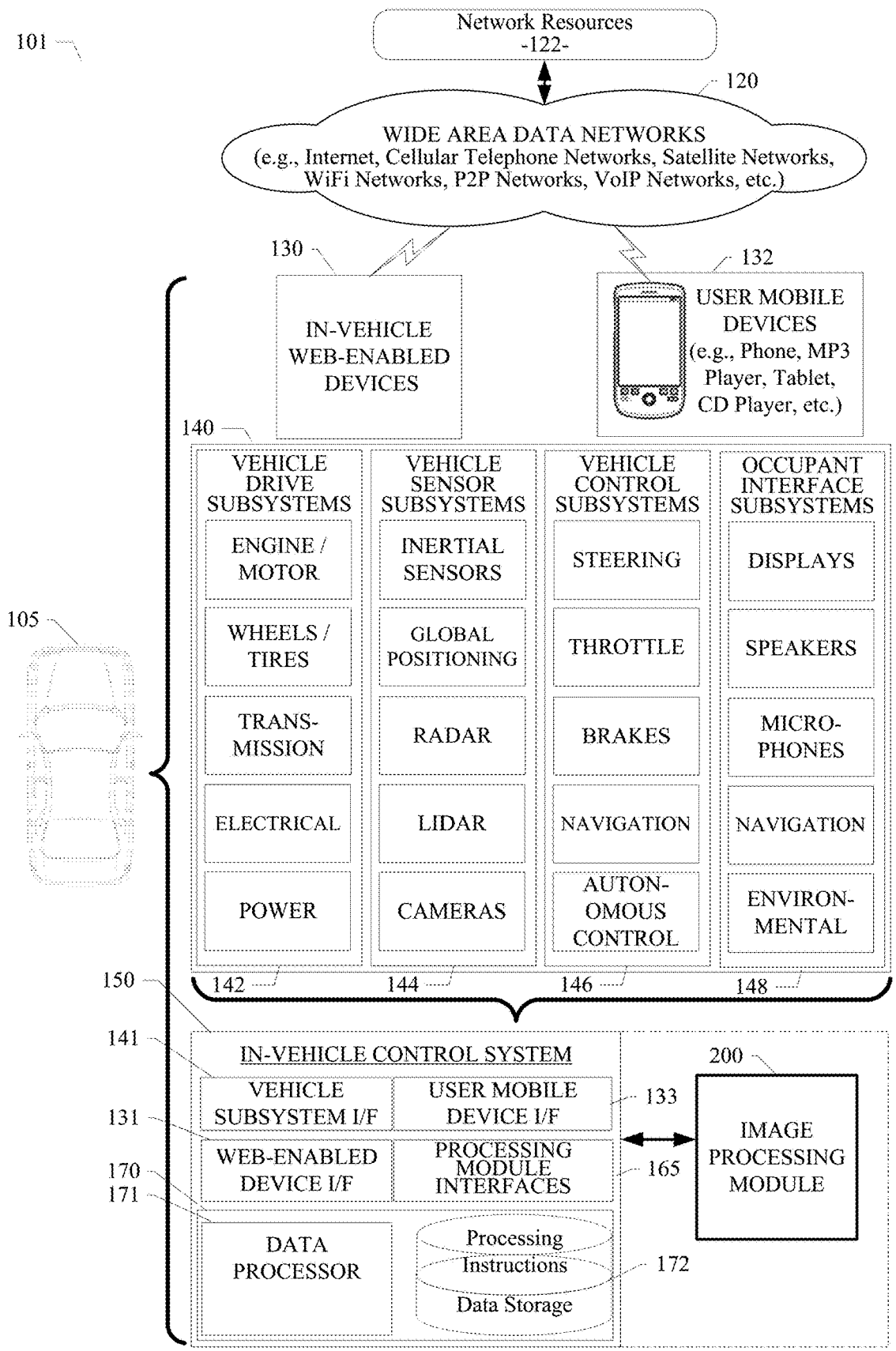
FIG. 1 illustrates a block diagram of an example ecosystem in which an in-vehicle image processing module of an example embodiment can be implemented.

Referring now to FIG. 1, a block diagram illustrates an example ecosystem 101 in which an in-vehicle control system 150 and an image processing module 200 of an example embodiment can be implemented. These components are described in more detail below. Ecosystem 101 includes a variety of systems and components that can generate and/or deliver one or more sources of information/data and related services to the in-vehicle control system 150 and the image processing module 200, which can be installed in the vehicle 105. For example, a camera installed in the vehicle 105, as one of the devices of vehicle subsystems 140, can generate image and timing data that can be received by the in-vehicle control system 150. The in-vehicle control system 150 and the image processing module 200 executing therein can receive this image and timing data input. As described in more detail below, the image processing module 200 can process the image input and extract object features, which can be used by an autonomous vehicle control subsystem, as another one of the subsystems of vehicle subsystems 140. The autonomous vehicle control subsystem, for example, can use the real-time extracted object features to safely and efficiently navigate and control the vehicle 105 through a real world driving environment while avoiding obstacles and safely controlling the vehicle.

In an example embodiment as described herein, the in-vehicle control system 150 can be in data communication with a plurality of vehicle subsystems 140, all of which can be resident in a user's vehicle 105. A vehicle subsystem interface 141 is provided to facilitate data communication between the in-vehicle control system 150 and the plurality of vehicle subsystems 140. The in-vehicle control system 150 can be configured to include a data processor 171 to execute the image processing module 200 for processing image data received from one or more of the vehicle subsystems 140. The data processor 171 can be combined with a data storage device 172 as part of a computing system 170 in the in-vehicle control system 150. The data storage device 172 can be used to store data, processing parameters, and data processing instructions. A processing module interface 165 can be provided to facilitate data communications between the data processor 171 and the image processing module 200. In various example embodiments, a plurality of processing modules, configured similarly to image processing module 200, can be provided for execution by data processor 171. As shown by the dashed lines in FIG. 1, the image processing module 200 can be integrated into the in-vehicle control system 150, optionally downloaded to the in-vehicle control system 150, or deployed separately from the in-vehicle control system 150.

The in-vehicle control system 150 can be configured to receive or transmit data from/to a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with network resources 122, such as websites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing image input or image input analysis. Antennas can serve to connect the in-vehicle control system 150 and the image processing module 200 with the data network 120 via cellular, satellite, radio, or other conventional signal reception mechanisms. Such cellular data networks are currently available (e.g., Verizon™, AT&T™, T-Mobile™, etc.). Such satellite-based data or content networks are also currently available (e.g., SiriusXM™, HughesNet™, etc.). The conventional broadcast networks, such as AM/FM radio networks, pager networks, UHF networks, gaming networks, WiFi networks, peer-to-peer networks, Voice over IP (VoIP) networks, and the like are also well-known. Thus, as described in more detail below, the in-vehicle control system 150 and the image processing module 200 can receive web-based data or content via an in-vehicle web-enabled device interface 131, which can be used to connect with the in-vehicle web-enabled device receiver 130 and network 120. In this manner, the in-vehicle control system 150 and the image processing module 200 can support a variety of network-connectable in-vehicle devices and systems from within a vehicle 105.

As shown in FIG. 1, the in-vehicle control system 150 and the image processing module 200 can also receive data, image processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, image processing control parameters, and content for the in-vehicle control system 150 and the image processing module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the image processing module 200 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the image processing module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The wheels may represent at least one wheel that is fixedly attached to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices. The vehicle sensor subsystem 144 may also include sensors configured to monitor internal systems of the vehicle 105 (e.g., an O2 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit could be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a steering unit, a throttle, a brake unit, a navigation unit, and an autonomous control unit.

The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the image processing module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the image processing module 200, the GPS transceiver, the RADAR, the LIDAR, the cameras, and other vehicle subsystems to determine the driving path or trajectory for the vehicle 105. The vehicle control system 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, means for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide means for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 142, the vehicle sensor subsystem 144, the vehicle control subsystem 146, and the occupant interface subsystems 148.

In addition to the processing instructions, the data storage device 172 may store data such as image processing parameters, training data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 142, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by the vehicle sensor subsystem 144 and the image processing module 200, move in a controlled manner, or follow a path or trajectory based on output generated by the image processing module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, and image processing module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the image processing module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the image processing module 200 can be implemented as in-vehicle components of vehicle 105. In various example embodiments, the in-vehicle control system 150 and the image processing module 200 in data communication therewith can be implemented as integrated components or as separate components. In an example embodiment, the software components of the in-vehicle control system 150 and/or the image processing module 200 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

System and Method for Vehicle Wheel Detection

In the various example embodiments disclosed herein, a system and method for vehicle wheel detection using image segmentation is provided. In an example embodiment, the system comprises three components: 1) data collection and annotation, 2) model training using deep convolutional neural networks, and 3) real-time model inference. To leverage the state-of-the-art deep learning models and training strategies, the various example embodiments disclosed herein form the wheel detection problem as a two-class segmentation task, and train on a deep neural network that excels on multi-class semantic segmentation problems. When the system obtains accurate wheel feature segmentation analysis for a given vehicle, the system can obtain or infer valuable vehicle information, such as pose, location, intention, and trajectory. This vehicle information can provide significant benefits for the perception, localization, and planning systems for autonomous driving. In various example embodiments described herein, the components of the vehicle wheel detection system are described below.

Data Collection and Annotation

In various example embodiments, the wheel segmentation problem can be defined in different ways, such as, 1) a bounding-box regression problem that requires only the location of the four corners of a rectangular bounding box, 2) a semantic segmentation problem which requires pixel-level labeling for the wheel area, or 3) an instance segmentation problem, which requires an assignment of different instance identifier numbers (IDs) for every single wheel. The example embodiments described herein provide an annotation paradigm that is efficient and suitable for all possible tasks. As vehicle wheels generally share similar visible shapes, such as a circle or an ellipse, the processing performed by the example embodiments transforms the vehicle wheel annotation task into a contour annotation task. That is, the example embodiments can be configured to identify and render the outline or contour surrounding every vehicle wheel detected in an input image. From the vehicle wheel contours, the example embodiments can be configured to generate corresponding detection bounding boxes by extracting the extreme values for all four directions (top, bottom, left, and right) of each vehicle wheel contour and generating the corresponding bounding boxes from these extreme values. Additionally, the example embodiments can be configured to obtain the semantic segmentation labels corresponding to the vehicle wheel contours by filling in the interior regions defined by the wheel contours. Finally, the example embodiments can also obtain the vehicle wheel instance labels by counting the number of closed vehicle wheel contours and generating different instance identifier numbers (IDs) for each instance of a vehicle wheel detected in the input image. As a result, the example embodiments can generate a variety of information based on the vehicle wheel contours identified in an input image. Importantly, drawing vehicle wheel contours is very easy for the human labelers, thus helping us to build a large machine learning training dataset efficiently. Thus, machine learning techniques can be used to enable the example embodiments to gather raw training image data and to train a machine learning model to identify and annotate vehicle wheel contours in an input image. Then, the example embodiments can generate the variety of information described above based on the identified vehicle wheel contours. A sample raw input image and the vehicle wheel contour labeling result produced by an example embodiment are shown in FIG. 2.

Figure 2:
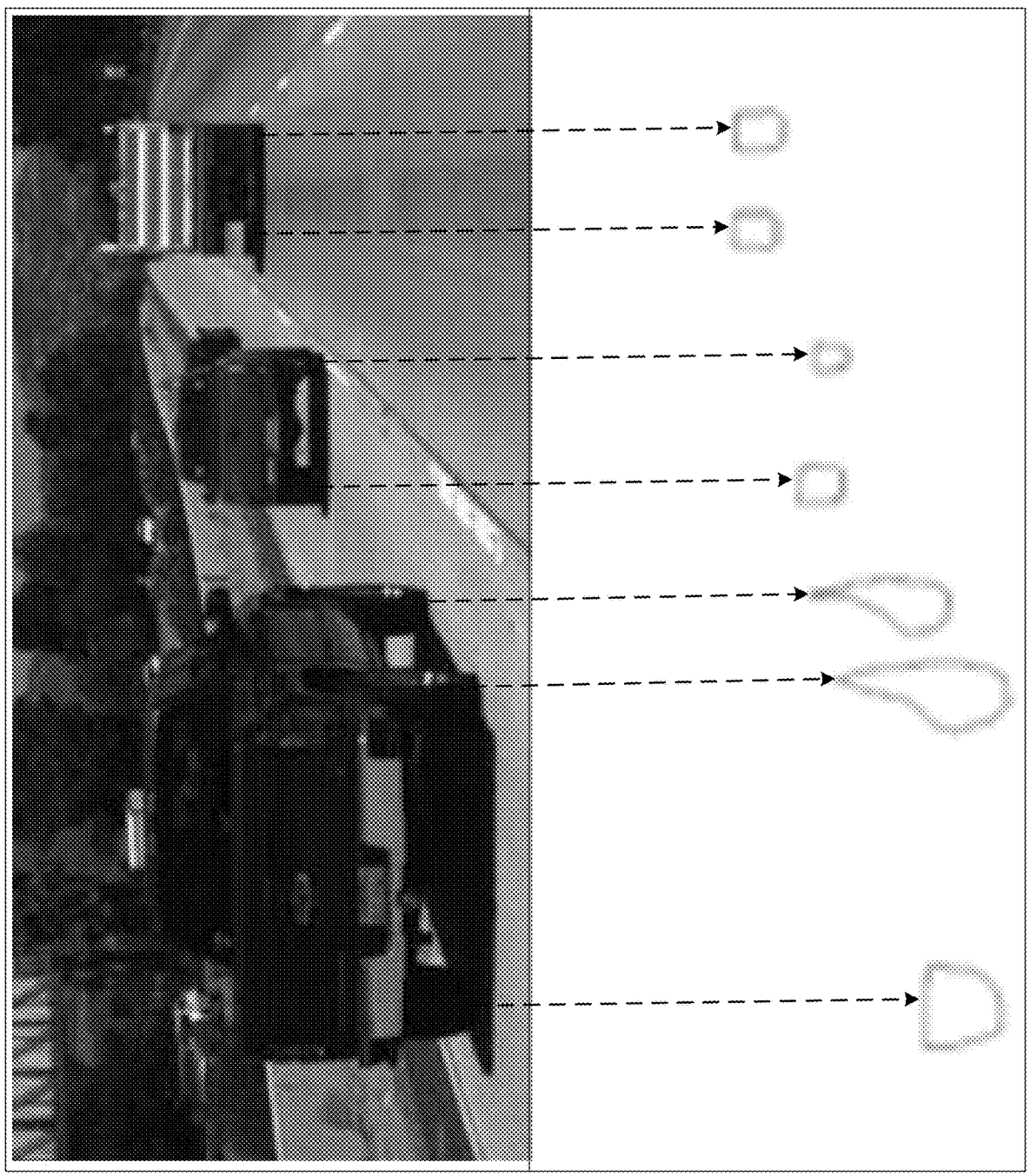
FIG. 2 illustrates an image fetched from a camera (upper image half) and its corresponding wheel contour annotation result (lower image half)

FIG. 2 illustrates a raw input image (FIG. 2, upper image half) fetched from a camera of an autonomous vehicle and the corresponding vehicle wheel contour labeling or annotation result (FIG. 2, lower image half in reverse color) produced by an example embodiment. The dashed arrows shown in FIG. 2 were added to highlight the association between each instance of a vehicle wheel contour annotation and the portion of the raw input image from which the vehicle wheel contour annotation was derived. As described in more detail below, a trained machine learning model can be used to generate the vehicle wheel contour annotations from the raw input images. This contour-level vehicle wheel annotation enabled by the example embodiments disclosed herein provides several important benefits, including allowing a transformation of the detected vehicle wheel object information to any desired format.

Model Training

In the example embodiments described herein, supervised learning methods can be used for classification of objects, object features, and object relationships captured in a set of input images. Supervised learning methods include a process of training classifiers or models using a set of training or test data in an offline training phase. By exacting pre-defined features and manually-annotated labels of each object (e.g., vehicle wheels) in the input images, the example embodiments can train one or more machine learning classifiers on many static training images. Additionally, the example embodiments can train machine learning classifiers on training image sequences. After the training phase, the trained machine learning classifiers can be used in a second phase, an operational or inference phase, to receive real-time images and effectively and efficiently detect each vehicle's wheel features in the received images. The training and operational use of the machine learning classifiers in the example embodiment is described in more detail below.

Figure 3:
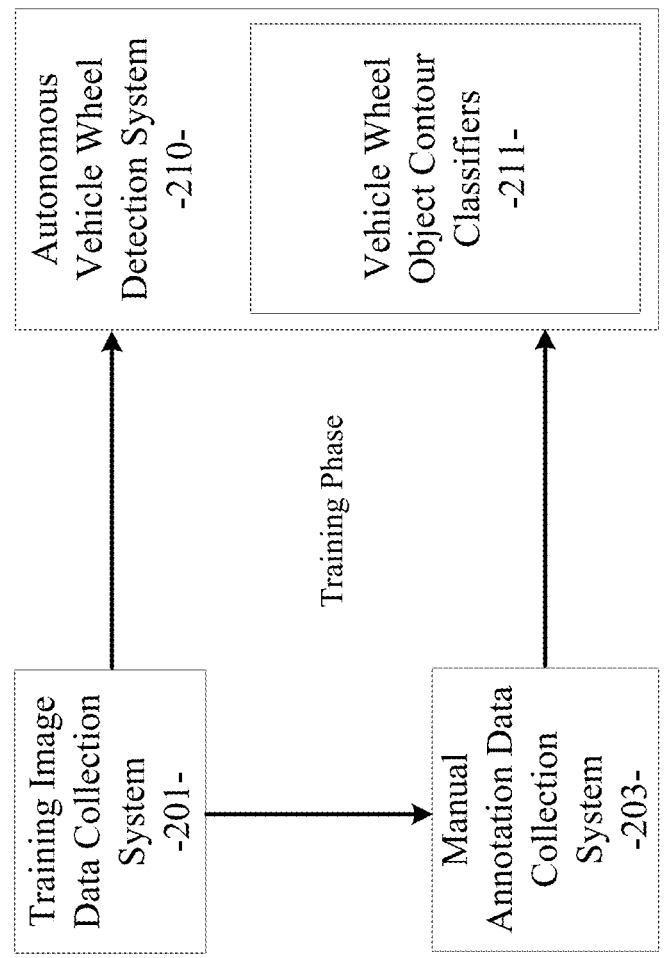
FIG. 3 illustrates the offline training phase (a first phase) used to configure or train the autonomous vehicle wheel detection system, and the classifiers therein, in an example embodiment.

Referring now to FIG. 3, an example embodiment disclosed herein can be used in the context of an autonomous vehicle wheel detection system 210 for autonomous vehicles. The autonomous vehicle wheel detection system 210 can be included in or executed by the image processing module 200 as described above. The autonomous vehicle wheel detection system 210 can include one or more vehicle wheel object contour classifiers 211, which can correspond to the machine learning classifiers described herein. It will be apparent to those of ordinary skill in the art in view of the disclosure herein that other types of classifiers or models can be equivalently used. FIG. 3 illustrates the offline training phase (a first phase) used to configure or train the autonomous vehicle wheel detection system 210, and the classifiers 211 therein, in an example embodiment based on training image data 201 and manually annotated image data 203 representing ground truth. In the example embodiment, a training image data collection system 201 can be used gather perception data to train or configure processing parameters for the autonomous vehicle wheel detection system 210 with training image data. As described in more detail below for an example embodiment, after the initial training phase, the autonomous vehicle wheel detection system 210 can be used in an operational, inference, or simulation phase (a second phase) to generate image feature predictions and wheel contour feature detections based on image data received by the autonomous vehicle wheel detection system 210 and based on the training the autonomous vehicle wheel detection system 210 receives during the initial offline training phase.

Referring again to FIG. 3, the training image data collection system 201 can include an array of perception information gathering devices or sensors that may include image generating devices (e.g., cameras), light amplification by stimulated emission of radiation (laser) devices, light detection and ranging (LIDAR) devices, global positioning system (GPS) devices, sound navigation and ranging (sonar) devices, radio detection and ranging (radar) devices, and the like. The perception information gathered by the information gathering devices at various traffic locations can include traffic or vehicle image data, roadway data, environmental data, distance data from LIDAR or radar devices, and other sensor information received from the information gathering devices of the data collection system 201 positioned adjacent to particular roadways (e.g., monitored locations). Additionally, the data collection system 201 can include information gathering devices installed in moving test vehicles being navigated through pre-defined routings in an environment or location of interest. Some portions of the ground truth data can also be gathered by the data collection system 201.

To expand the size and to improve the variance of the training image dataset, the data collection system 201 can collect images from both wide-angle and long-focus cameras that are installed on vehicles, under a wide range of driving scenarios: local, highway, sunny, cloudy, city, rural, bridge, desert, etc. The training image dataset can be split into a training dataset that is used for model training, and a testing dataset that is used for model evaluation.

The image data collection system 201 can collect actual images of vehicles, moving or static objects, roadway features, environmental features, and corresponding ground truth data under different scenarios. The different scenarios can correspond to different locations, different traffic patterns, different environmental conditions, and the like. The image data and other perception data and ground truth data collected by the data collection system 201 reflects truly realistic, real-world traffic information related to the locations or routings, the scenarios, and the vehicles or objects being monitored. Using the standard capabilities of well-known data collection devices, the gathered traffic and vehicle image data and other perception or sensor data can be wirelessly transferred (or otherwise transferred) to a data processor of a standard computing system, upon which the image data collection system 201 can be executed. Alternatively, the gathered traffic and vehicle image data and other perception or sensor data can be stored in a memory device at the monitored location or in the test vehicle and transferred later to the data processor of the standard computing system.

As shown in FIG. 3, a manual annotation data collection system 203 is provided to apply labels to features found in the training images collected by the data collection system 201. These training images can be analyzed by human labelers or automated processes to manually define labels or classifications for each of the features identified in the training images. The manually applied data can also include object relationship information including a status for each of the objects in a frame of the training image data. For example, manual labelers can draw the contours of vehicle wheel objects detected in the training image datasets. As such, the manually annotated image labels and object relationship information can represent the ground truth data corresponding to the training images from the image data collection system 201. These feature labels or ground truth data can be provided to the autonomous vehicle wheel detection system 210 as part of the offline training phase as described in more detail below.

The traffic and vehicle image data and other perception or sensor data for training, the feature label data, and the ground truth data gathered or calculated by the training image data collection system 201 and the object or feature labels produced by the manual annotation data collection system 203 can be used to generate training data, which can be processed by the autonomous vehicle wheel detection system 210 in the offline training phase. For example, as well-known, classifiers, models, neural networks, and other machine learning systems can be trained to produce configured output based on training data provided to the classifiers, models, neural networks, or other machine learning systems in a training phase. As described in more detail below, the training data provided by the image data collection system 201 and the manual annotation data collection system 203 can be used to train the autonomous vehicle wheel detection system 210, and the classifiers 211 therein, to determine the vehicle wheel contour features corresponding to the objects (e.g., vehicle wheels) identified in the training images. The offline training phase of the autonomous vehicle wheel detection system 210 is described in more detail below.

The example embodiments can train and use machine learning classifiers in the vehicle wheel detection process. These machine learning classifiers are represented in FIG. 3 as vehicle wheel object contour classifiers 211. In the example embodiment, the vehicle wheel object contour classifiers 211 can be trained with images from the training image dataset. In this manner, the vehicle wheel object contour classifiers 211 can effectively and efficiently detect the vehicle wheel features of each vehicle from a set of input images. The training of the vehicle wheel object contour classifiers 211 in an example embodiment is described in more detail below.

Figure 4:
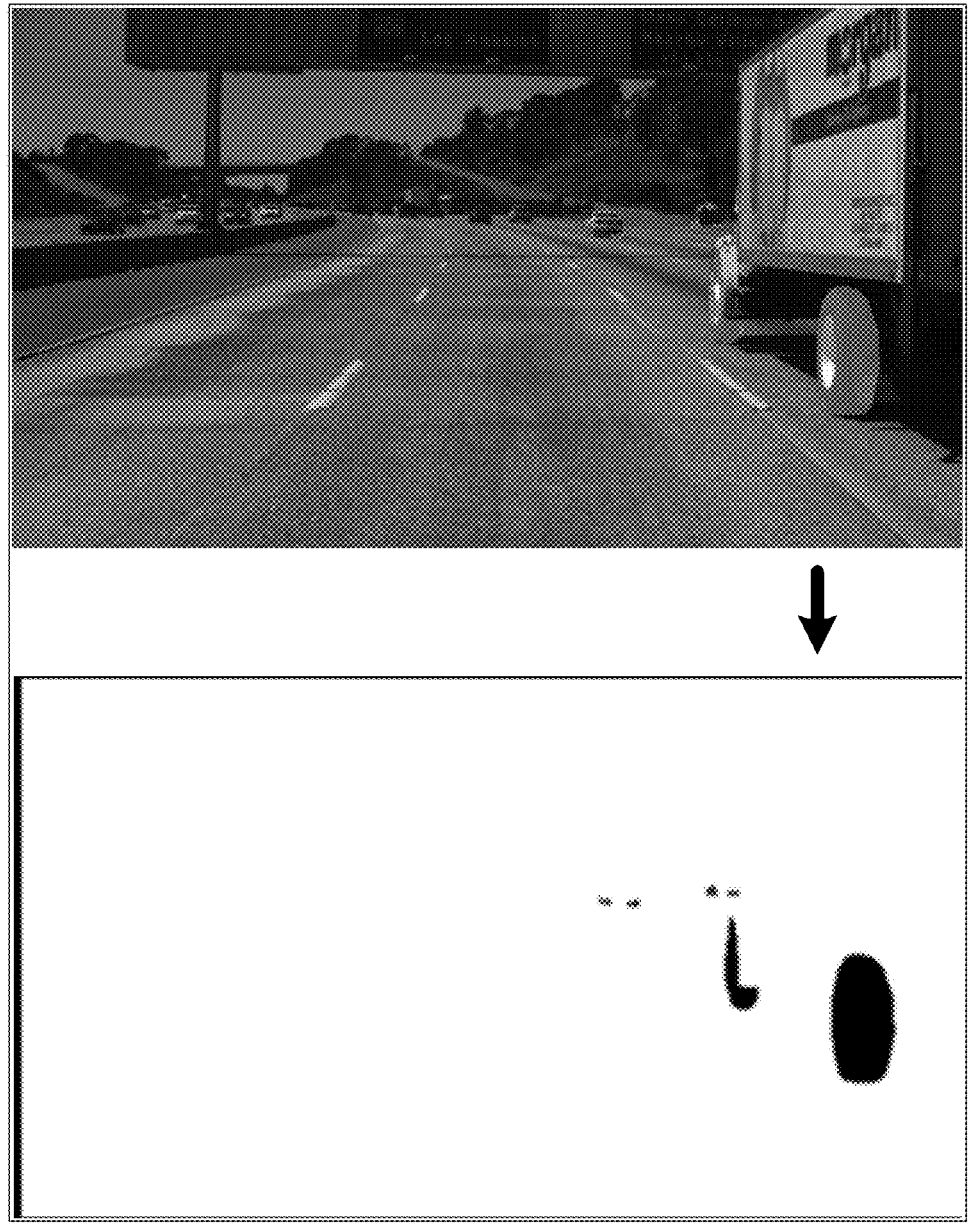
FIG. 4 (lower image half) illustrates an example ground truth label map that can be used for training a segmentation model according to an example embodiment.

Referring now to FIG. 4 (upper image half), the diagram illustrates a blended visualization of an original example raw training image combined with the ground truth. FIG. 4 illustrates a sample training image that may be used by an example embodiment to train the vehicle wheel object contour classifiers 211 to process a training image. The raw training image can be one of the training images provided to the autonomous vehicle wheel detection system 210 by the training image data collection system 201 as described above. The training image data from the raw training image can be collected and provided to the autonomous vehicle wheel detection system 210, where the features of the raw training image can be extracted. Semantic segmentation or similar processes can be used for the feature extraction. As well-known, feature extraction can provide a pixel-level object label and bounding box for each feature or object identified in the image data. In many cases, the features or objects identified in the image data will correspond to vehicle wheel objects. As such, vehicle wheel objects in the input training image can be extracted and represented with labels and bounding boxes. The bounding boxes can be represented as a rectangular box of a size corresponding to the contour of the extracted vehicle wheel object. Additionally, object-level contour detections for each vehicle wheel object can also be performed using known techniques. As a result, the autonomous vehicle wheel detection system 210 can obtain or produce, for each received training image, vehicle wheel object detection data represented with labels and bounding boxes and object-level contour detections for each instance of vehicle wheel objects in the training images. Referring now to FIG. 4 (lower image half), the diagram illustrates an example ground truth label map that can be used for training a segmentation model according to an example embodiment.

Because the exact shape and accurate location of a vehicle wheel provides much more information than a bounding box, an example embodiment can adopt a semantic segmentation framework for the vehicle wheel detection task, which is also not over-complicated compared with an instance segmentation task. The formal definition of the problem can be described as the following:

Given a raw input RGB (red/green/blue) image I,
output a label map R that has the same size as I
with vehicle wheel pixels labeled as 1
and background pixels labeled as 0.

The example embodiment can process the labeled vehicle wheel contour data to generate the ground truth by filling in the interior regions defined by the vehicle wheel contours and performing dilation to obtain more positive training samples (e.g., vehicle wheel objects) to alleviate the potential data unbalancing problem.

An example embodiment can use a fully convolutional neural network (FCN) as a machine learning model trained for the vehicle wheel object contour detection task as described herein. General forms of FCNs have been widely applied to pixel level image-to-image learning tasks. In the example embodiment, the FCN trained for the vehicle wheel object contour detection task (e.g., the machine learning model) can be customized to include semantic segmentation using dense upsampling convolution (DUC) and semantic segmentation using hybrid dilated convolution (HDC) as described in the related patent applications referenced above. The FCN for the vehicle wheel object contour detection task can be pre-trained on more complex multi-class scene parsing tasks so the learned features can speed up the training process. Because the image background contains far more pixels than the image foreground (e.g., vehicle wheels), the example embodiment can use a weighted multi-logistic loss function to train the machine learning model to ensure proper training and alleviate overfitting. The example embodiment can train the whole machine learning model using stochastic gradient descent (SGD) for sufficient iterations to ensure convergence.

At this point, the offline training process is complete and the parameters associated with the one or more classifiers 211 have been properly adjusted to cause the one or more classifiers 211 to sufficiently detect vehicle object wheel features corresponding to the input image data. After being trained by the offline training process as described above, the one or more classifiers 211 with their properly adjusted parameters can be deployed in an operational, inference, or simulation phase (a second phase) as described below in connection with FIG. 5.

Inference

Figure 5:
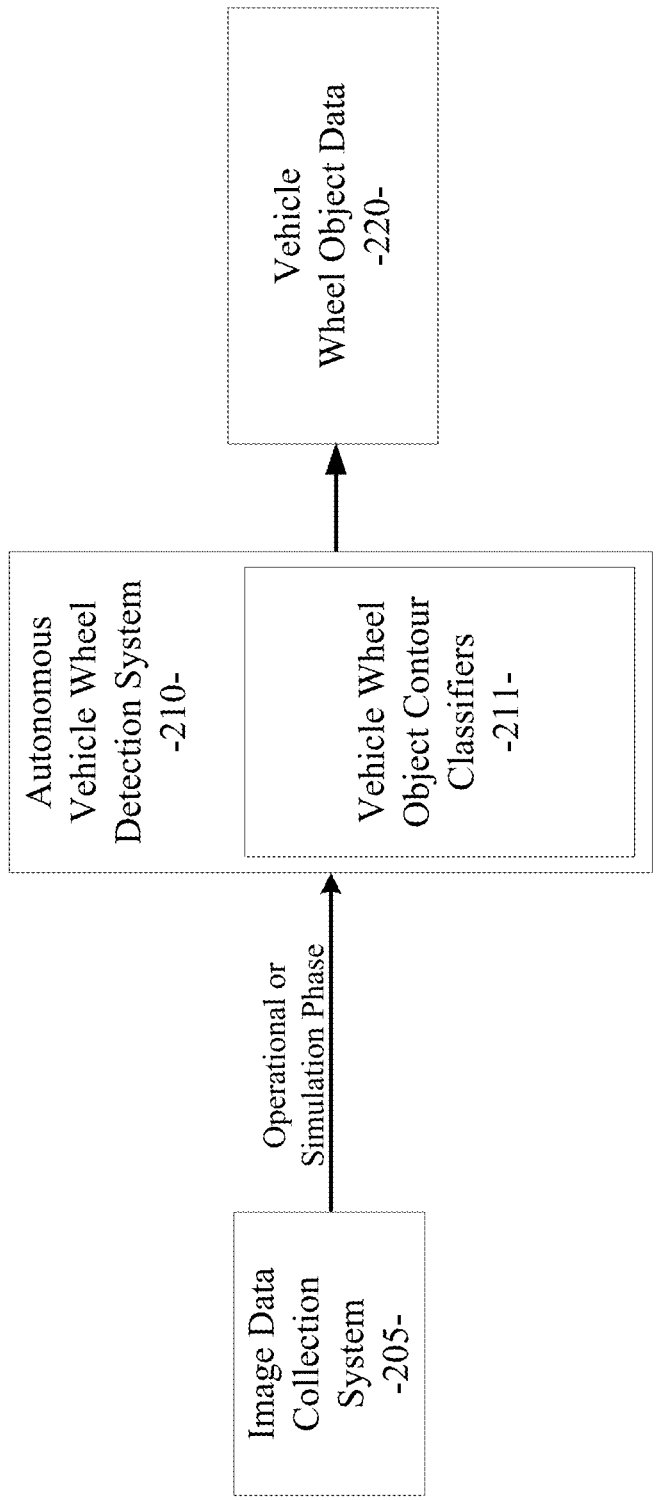
FIG. 5 illustrates a second phase for operational or simulation use of the autonomous vehicle wheel detection system in an example embodiment.

After the FCN training converges, the example embodiments can use the pre-trained FCN to perform model inference in a second or operational phase. FIG. 5 illustrates a second phase for operational or simulation use of the autonomous vehicle wheel detection system 210 in an example embodiment. As shown in FIG. 5, the autonomous vehicle wheel detection system 210 can receive real-world operational image data, including static images and image sequences, from the image data collection system 205. The image data collection system 205 can include an array of perception information gathering devices, sensors, and/or image generating devices on or associated with an autonomous vehicle, similar to the perception information gathering devices of the image data collection system 201, except that image data collection system 205 collects real-world operational image data and not training image data. As described in more detail herein, the autonomous vehicle wheel detection system 210 can process the input real-world operational image data by applying the one or more trained vehicle wheel object contour classifiers 211 to produce vehicle wheel object data 220, which can be used by other autonomous vehicle subsystems to configure or control the operation of the autonomous vehicle. As also described above, semantic segmentation or similar processes can be used for the vehicle wheel object extraction from the real-world image data.

To obtain the tradeoff between inference speed and model precision, an example embodiment can resize all input images to a width of 512 and a height of 288 so that we achieve real-time (50 HZ) performance while maintaining a high accuracy (recall ≥0.9). Examples of ground truth image and the corresponding prediction results are illustrated in FIGS. 6 through 10. It can be seen that the trained model of the example embodiment achieves excellent results in various conditions, such as different vehicle types (e.g., cars, trucks, etc.), different distances (proximal and distal), and different illumination conditions (e.g., sunny, shade, etc.).

Figure 6:
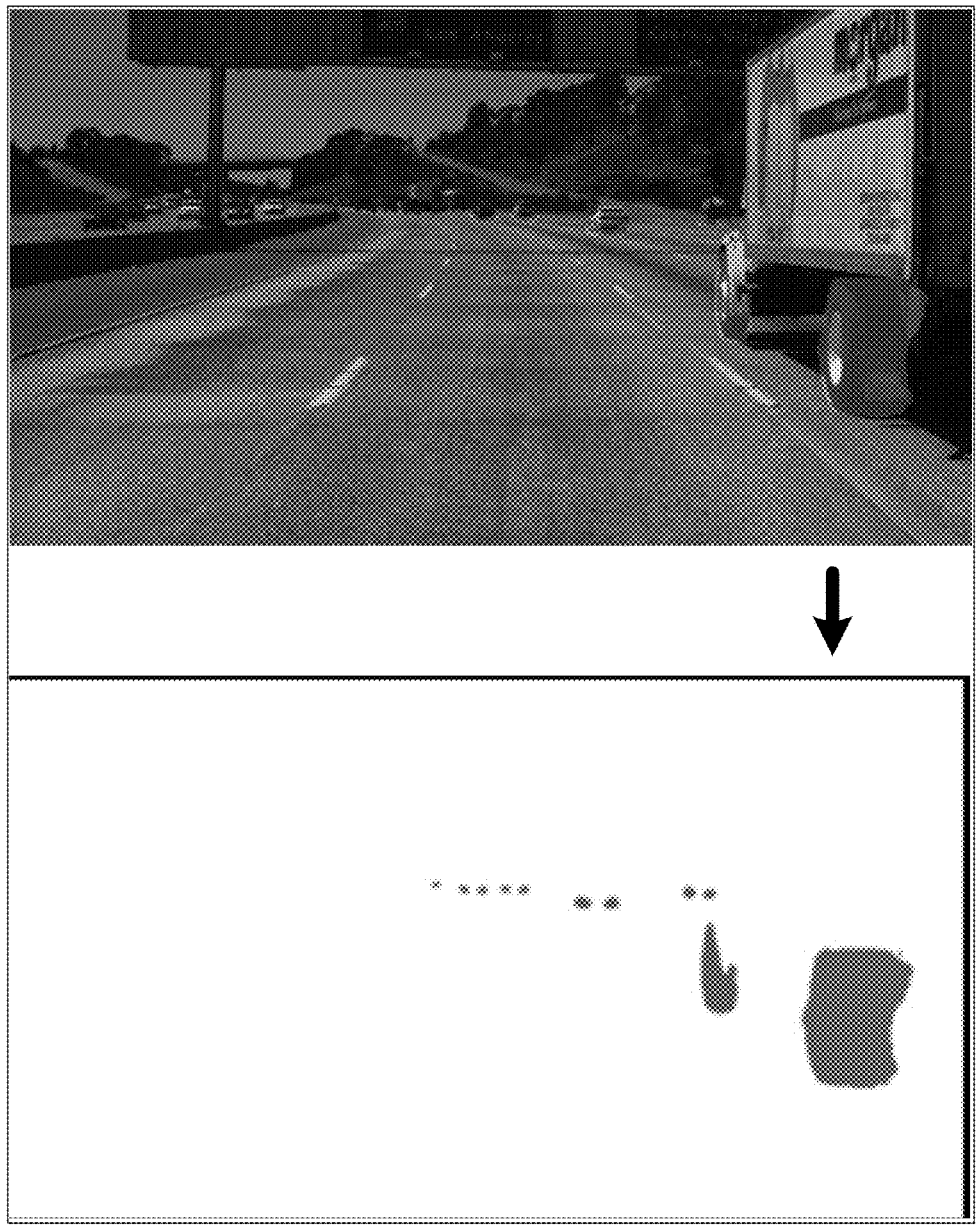
FIG. 6 (lower image half) illustrates an example predicted label map using the trained segmentation model trained with the example image of FIG. 4, among other training images.

FIG. 6 (lower image half) illustrates an example predicted label map using the trained segmentation model trained with the example image of FIG. 4, among other training images. FIG. 6 (upper image half) also illustrates the blended visualization of the original example image combined with the prediction result.

Figure 7:
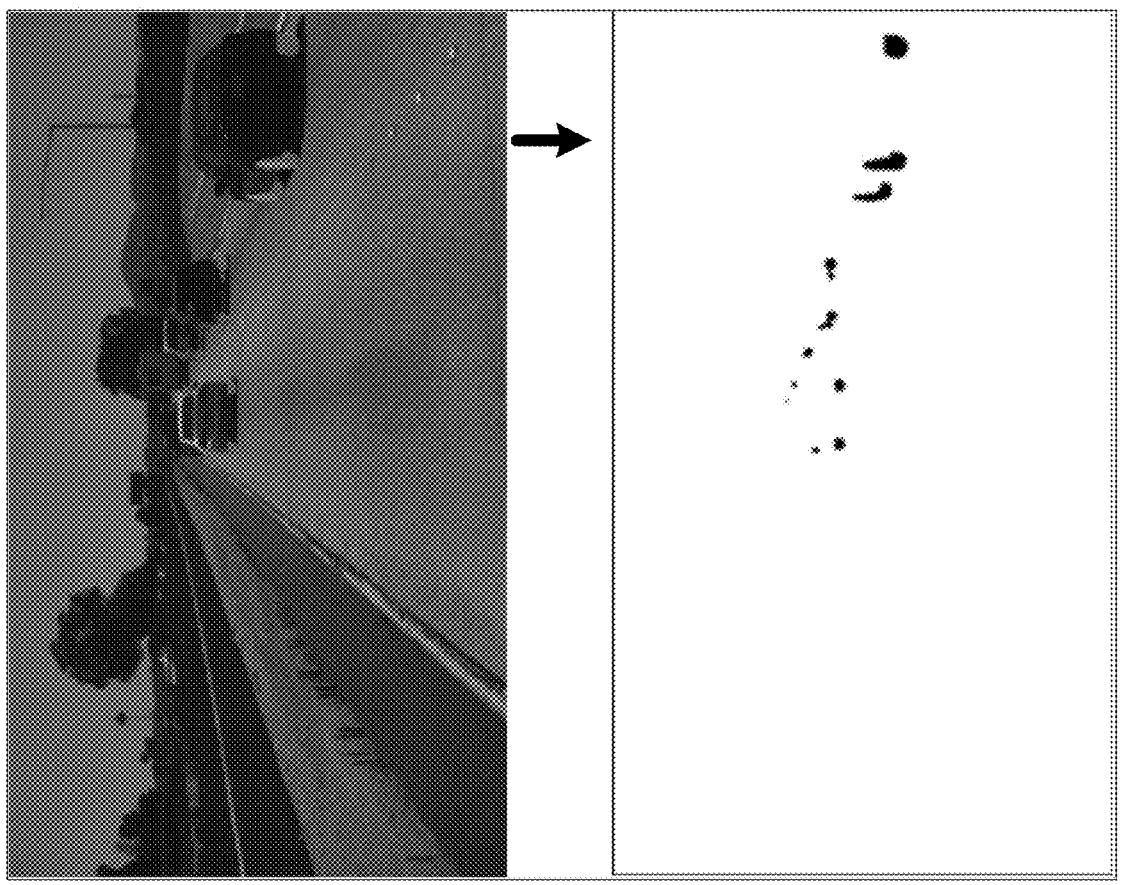
FIG. 7 (lower image half) illustrates another example ground truth label map that can be used for training the segmentation model according to an example embodiment.

FIG. 7 (lower image half) illustrates another example ground truth label map that can be used for training the segmentation model according to an example embodiment. FIG. 7 (upper image half) also illustrates the blended visualization of the original example image combined with the ground truth.

Figure 8:
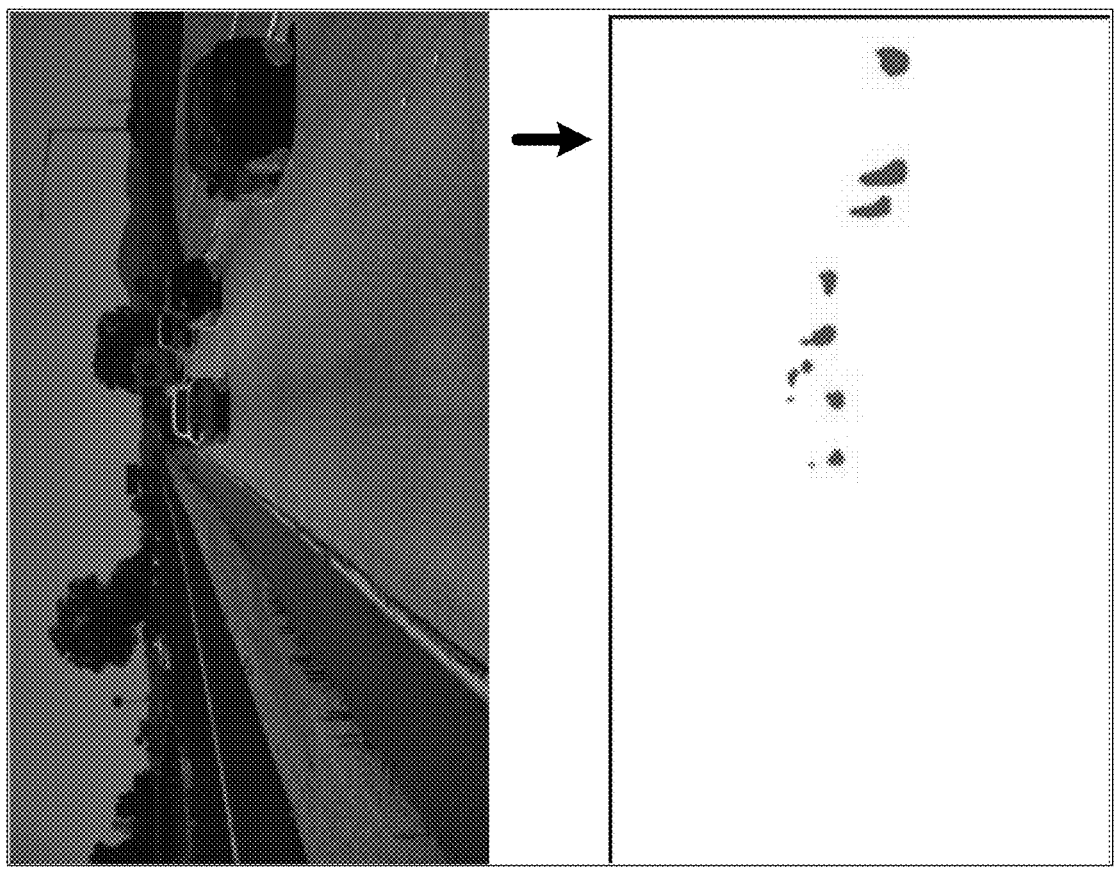
FIG. 8 (lower image half) illustrates an example predicted label map using the trained segmentation model trained with the example image of FIG. 7, among other training images.

FIG. 8 (lower image half) illustrates an example predicted label map using the trained segmentation model trained with the example image of FIG. 7, among other training images. FIG. 8 (upper image half) also illustrates the blended visualization of the original example image combined with the prediction result.

Figure 9:
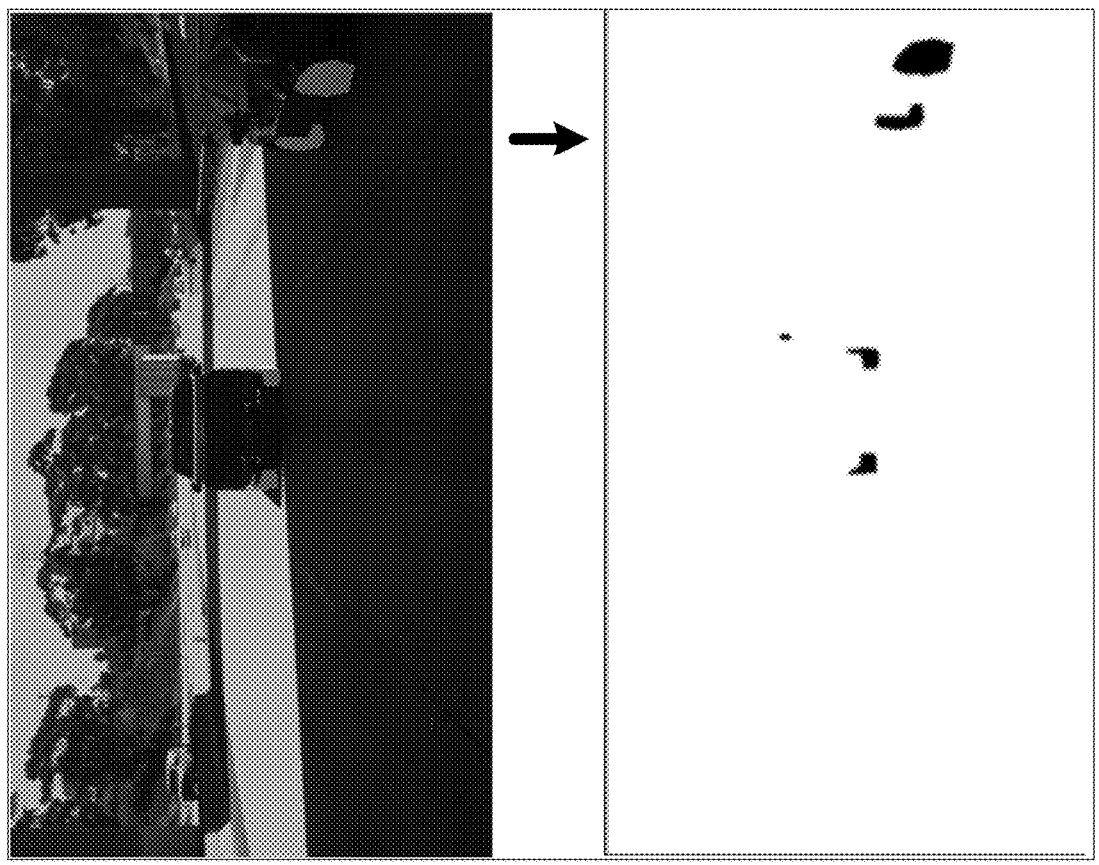
FIG. 9 (lower image half) illustrates yet another example ground truth label map that can be used for training the segmentation model according to an example embodiment.

FIG. 9 (lower image half) illustrates yet another example ground truth label map that can be used for training the segmentation model according to an example embodiment. FIG. 9 (upper image half) also illustrates the blended visualization of the original example image combined with the ground truth.

Figure 10:
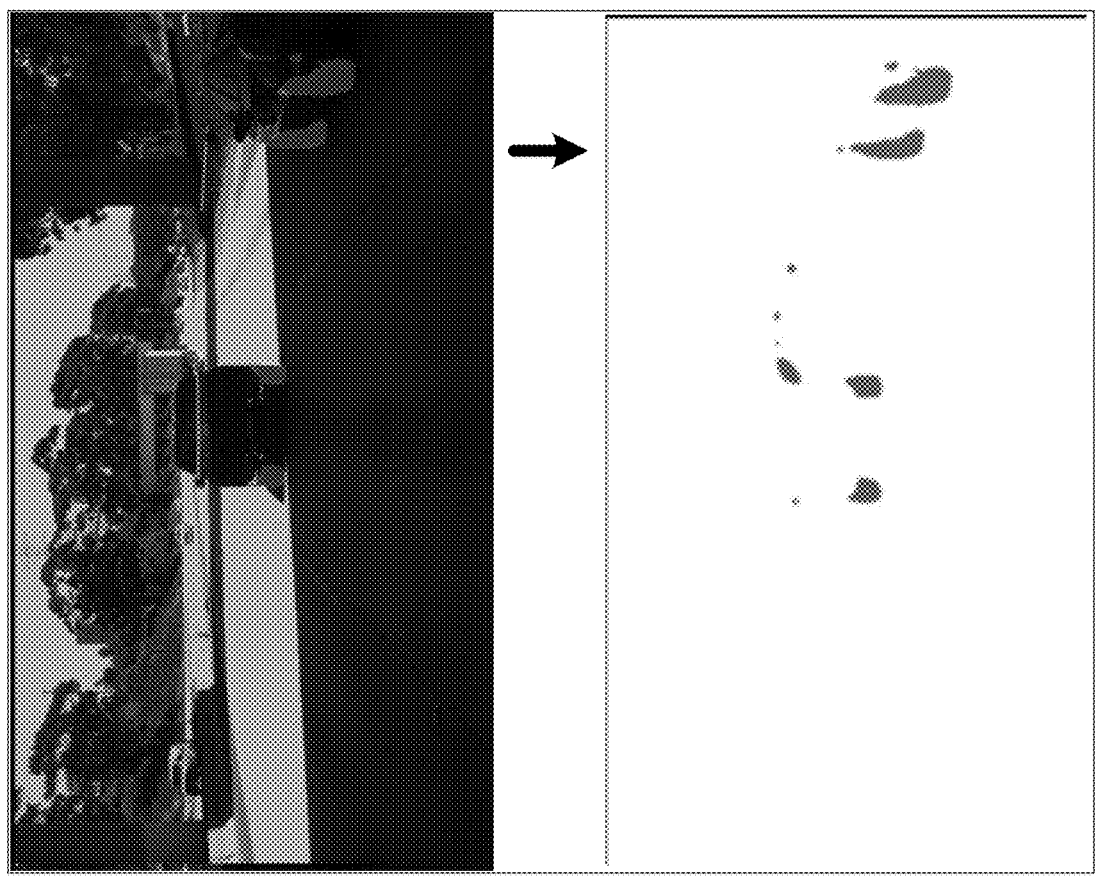
FIG. 10 (lower image half) illustrates an example predicted label map using the trained segmentation model trained with the example image of FIG. 9, among other training images.

FIG. 10 (lower image half) illustrates an example predicted label map using the trained segmentation model trained with the example image of FIG. 9, among other training images. FIG. 10 (upper image half) also illustrates the blended visualization of the original example image combined with the prediction result.

The autonomous vehicle wheel detection system 210 can process the input image data with the one or more trained classifiers 211 to produce vehicle wheel object data 220, which can be used by other autonomous vehicle subsystems to configure or control the operation of the autonomous vehicle. Thus, a system and method for vehicle wheel detection for autonomous vehicle control are disclosed.

Figure 11:
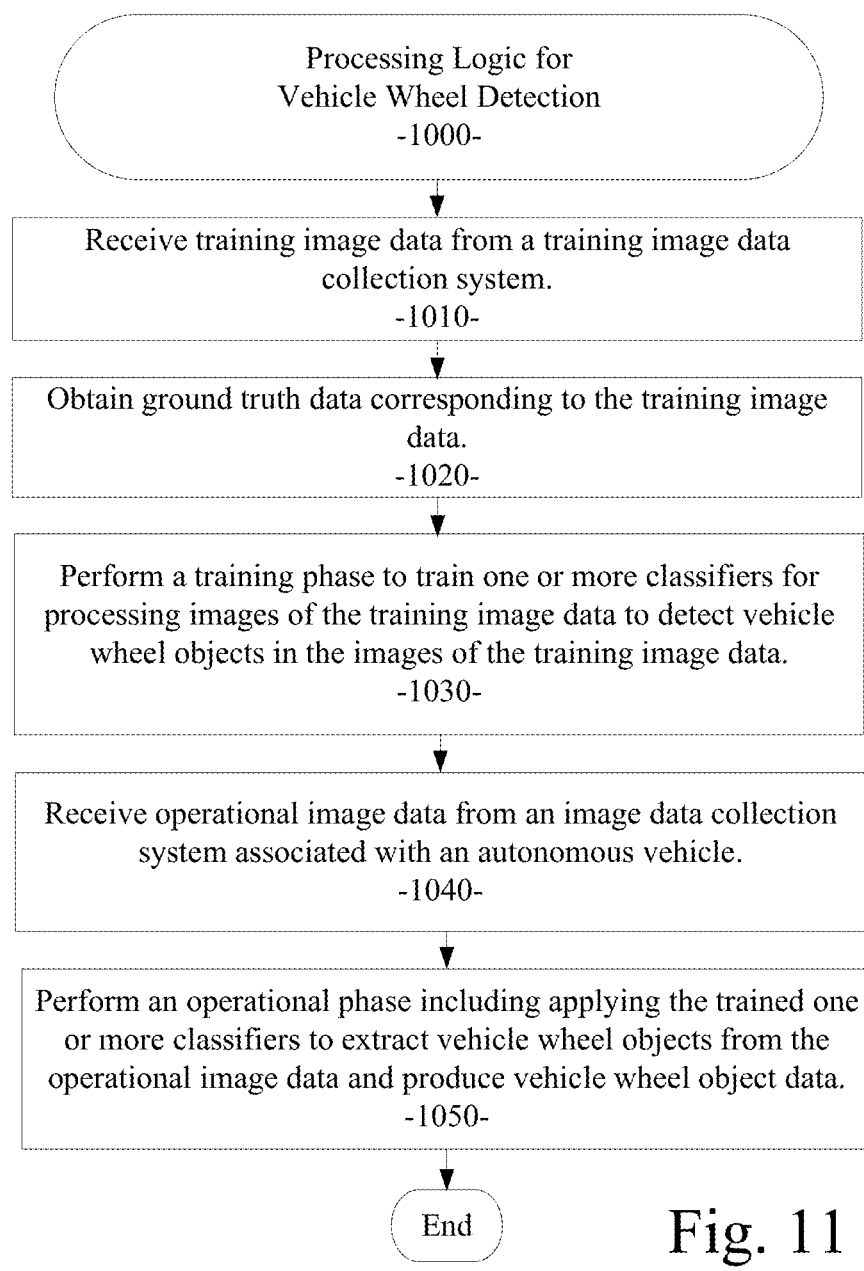
FIG. 11 is a process flow diagram illustrating an example embodiment of a system and method for vehicle wheel detection.

Referring now to FIG. 11, a flow diagram illustrates an example embodiment of a system and method 1000 for vehicle wheel detection. The example embodiment can be configured to: receive training image data from a training image data collection system (processing block 1010); obtain ground truth data corresponding to the training image data (processing block 1020); perform a training phase to train one or more classifiers for processing images of the training image data to detect vehicle wheel objects in the images of the training image data (processing block 1030); receive operational image data from an image data collection system associated with an autonomous vehicle (processing block 1040); and perform an operational phase including applying the trained one or more classifiers to extract vehicle wheel objects from the operational image data and produce vehicle wheel object data (processing block 1050).

As used herein and unless specified otherwise, the term "mobile device" includes any computing or communications device that can communicate with the in-vehicle control system 150 and/or the image processing module 200 described herein to obtain read or write access to data signals, messages, or content communicated via any mode of data communications. In many cases, the mobile device 130 is a handheld, portable device, such as a smart phone, mobile phone, cellular telephone, tablet computer, laptop computer, display pager, radio frequency (RF) device, infrared (IR) device, global positioning device (GPS), Personal Digital Assistants (PDA), handheld computers, wearable computer, portable game console, other mobile communication and/or computing device, or an integrated device combining one or more of the preceding devices, and the like. Additionally, the mobile device 130 can be a computing device, personal computer (PC), multiprocessor system, microprocessor-based or programmable consumer electronic device, network PC, diagnostics equipment, a system operated by a vehicle 119 manufacturer or service technician, and the like, and is not limited to portable devices. The mobile device 130 can receive and process data in any of a variety of data formats. The data format may include or be configured to operate with any programming format, protocol, or language including, but not limited to, JavaScript, C++, iOS, Android, etc.

As used herein and unless specified otherwise, the term "network resource" includes any device, system, or service that can communicate with the in-vehicle control system 150 and/or the image processing module 200 described herein to obtain read or write access to data signals, messages, or content communicated via any mode of inter-process or networked data communications. In many cases, the network resource 122 is a data network accessible computing platform, including client or server computers, websites, mobile devices, peer-to-peer (P2P) network nodes, and the like. Additionally, the network resource 122 can be a web appliance, a network router, switch, bridge, gateway, diagnostics equipment, a system operated by a vehicle 119 manufacturer or service technician, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein. The network resources 122 may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3—MP3, and the like), video (e.g., MP4, and the like), and any proprietary interchange format defined by specific content sites can be supported by the various embodiments described herein.

The wide area data network 120 (also denoted the network cloud) used with the network resources 122 can be configured to couple one computing or communication device with another computing or communication device. The network may be enabled to employ any form of computer readable data or media for communicating information from one electronic device to another. The network 120 can include the Internet in addition to other wide area networks (WANs), cellular telephone networks, metro-area networks, local area networks (LANs), other packet-switched networks, circuit-switched networks, direct data connections, such as through a universal serial bus (USB) or Ethernet port, other forms of computer-readable media, or any combination thereof. The network 120 can include the Internet in addition to other wide area networks (WANs), cellular telephone networks, satellite networks, over-the-air broadcast networks, AM/FM radio networks, pager networks, UHF networks, other broadcast networks, gaming networks, WiFi networks, peer-to-peer networks, Voice Over IP (VoIP) networks, metro-area networks, local area networks (LANs), other packet-switched networks, circuit-switched networks, direct data connections, such as through a universal serial bus (USB) or Ethernet port, other forms of computer-readable media, or any combination thereof. On an interconnected set of networks, including those based on differing architectures and protocols, a router or gateway can act as a link between networks, enabling messages to be sent between computing devices on different networks. Also, communication links within networks can typically include twisted wire pair cabling, USB, Firewire, Ethernet, or coaxial cable, while communication links between networks may utilize analog or digital telephone lines, full or fractional dedicated digital lines including T1, T2, T3, and T4, Integrated Services Digital Networks (ISDNs), Digital User Lines (DSLs), wireless links including satellite links, cellular telephone links, or other communication links known to those of ordinary skill in the art. Furthermore, remote computers and other related electronic devices can be remotely connected to the network via a modem and temporary telephone link.

The network 120 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network may also include an autonomous system of terminals, gateways, routers, and the like connected by wireless radio links or wireless transceivers. These connectors may be configured to move freely and randomly and organize themselves arbitrarily, such that the topology of the network may change rapidly. The network 120 may further employ one or more of a plurality of standard wireless and/or cellular protocols or access technologies including those set forth herein in connection with network interface 712 and network 714 described in the figures herewith.

In a particular embodiment, a mobile device 132 and/or a network resource 122 may act as a client device enabling a user to access and use the in-vehicle control system 150 and/or the image processing module 200 to interact with one or more components of a vehicle subsystem. These client devices 132 or 122 may include virtually any computing device that is configured to send and receive information over a network, such as network 120 as described herein. Such client devices may include mobile devices, such as cellular telephones, smart phones, tablet computers, display pagers, radio frequency (RF) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. The client devices may also include a wireless application device on which a client application is configured to enable a user of the device to send and receive information to/from network resources wirelessly via the network.

The in-vehicle control system 150 and/or the image processing module 200 can be implemented using systems that enhance the security of the execution environment, thereby improving security and reducing the possibility that the in-vehicle control system 150 and/or the image processing module 200 and the related services could be compromised by viruses or malware. For example, the in-vehicle control system 150 and/or the image processing module 200 can be implemented using a Trusted Execution Environment, which can ensure that sensitive data is stored, processed, and communicated in a secure way.

Figure 12:
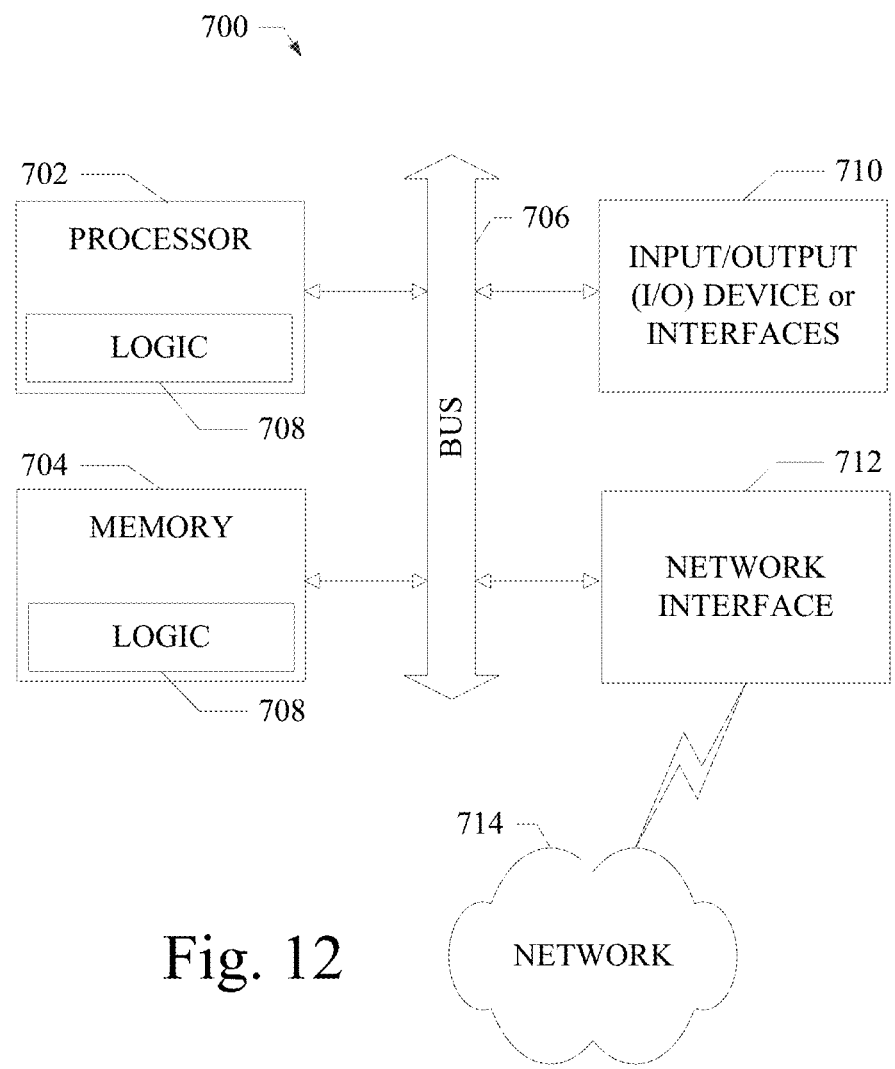
FIG. 12 shows a diagrammatic representation of machine in the example form of a computer system within which a set of instructions when executed may cause the machine to perform any one or more of the methodologies discussed herein.

FIG. 12 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth©, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
a data processor; and
an autonomous vehicle wheel detection system, executable by the data processor, the autonomous vehicle wheel detection system being configured to perform an autonomous vehicle wheel detection operation for autonomous vehicles, the autonomous vehicle wheel detection operation being configured to:
receive training image data from a training image data collection system;
obtain ground truth data corresponding to the training image data;
perform a training phase to train one or more classifiers for processing images of the training image data to detect vehicle wheel objects of other vehicles in the images of the training image data;
receive operational image data from an image data collection system associated with an autonomous vehicle; and
perform an operational phase including applying the trained one or more classifiers to extract vehicle wheel objects of other vehicles from the operational image data and produce vehicle wheel object data related to wheels of other vehicles, the vehicle wheel object data including vehicle wheel contour data corresponding to the contours surrounding the wheels of other vehicles.

2. The system of claim 1 wherein the training phase being configured to obtain ground truth data from a manual image annotation or labeling process.

3. The system of claim 1 being further configured to generate a blended visualization of a raw image combined with the ground truth.

4. The system of claim 1 being further configured to generate the ground truth by filling in the interior regions defined by contours surrounding the extracted vehicle wheel objects.

5. The system of claim 1 being further configured to use a fully convolutional neural network (FCN) as a machine learning model.

6. The system of claim 1 being further configured to use a fully convolutional neural network (FCN) as a machine learning model with semantic segmentation using dense upsampling convolution (DUC) and semantic segmentation using hybrid dilated convolution (HDC).

7. The system of claim 1 being configured to generate object-level contour detections for each extracted vehicle wheel object of the operational image data.

8. A method comprising:
receiving training image data from a training image data collection system;
obtaining ground truth data corresponding to the training image data;
performing a training phase to train one or more classifiers for processing images of the training image data to detect vehicle wheel objects of other vehicles in the images of the training image data;
receiving operational image data from an image data collection system associated with an autonomous vehicle; and
performing an operational phase including applying the trained one or more classifiers to extract vehicle wheel objects of other vehicles from the operational image data and produce vehicle wheel object data related to wheels of other vehicles, the vehicle wheel object data including vehicle wheel contour data corresponding to the contours surrounding the wheels of other vehicles.

9. The method of claim 8 wherein the training phase includes obtaining ground truth data from a manual image annotation or labeling process.

10. The method of claim 8 including generating a blended visualization of a raw image combined with the ground truth.

11. The method of claim 8 including generating the ground truth by filling in the interior regions defined by contours surrounding the extracted vehicle wheel objects.

12. The method of claim 8 including using a fully convolutional neural network (FCN) as a machine learning model.

13. The method of claim 8 including using a fully convolutional neural network (FCN) as a machine learning model with semantic segmentation using dense upsampling convolution (DUC) and semantic segmentation using hybrid dilated convolution (HDC).

14. The method of claim 8 including generating object-level contour detections for each extracted vehicle wheel object of the operational image data.

15. A non-transitory machine-useable storage medium embodying instructions which, when executed by a machine, cause the machine to:
receive training image data from a training image data collection system;
obtain ground truth data corresponding to the training image data;
perform a training phase to train one or more classifiers for processing images of the training image data to detect vehicle wheel objects of other vehicles in the images of the training image data;
receive operational image data from an image data collection system associated with an autonomous vehicle; and
perform an operational phase including applying the trained one or more classifiers to extract vehicle wheel objects of other vehicles from the operational image data and produce vehicle wheel object data related to wheels of other vehicles, the vehicle wheel object data including vehicle wheel contour data corresponding to the contours surrounding the wheels of other vehicles.

16. The non-transitory machine-useable storage medium of claim 15 wherein the training phase being configured to obtain ground truth data from a manual image annotation or labeling process.

17. The non-transitory machine-useable storage medium of claim 15 being further configured to generate a blended visualization of a raw image combined with the ground truth.

18. The non-transitory machine-useable storage medium of claim 15 being further configured to generate the ground truth by filling in the interior regions defined by contours surrounding the extracted vehicle wheel objects.

19. The non-transitory machine-useable storage medium of claim 15 being further configured to use a fully convolutional neural network (FCN) as a machine learning model.

20. The non-transitory machine-useable storage medium of claim 15 being configured to generate object-level contour detections for each extracted vehicle wheel object of the operational image data.

* * * * *